April 21, 1964 C. VAN DER LELY ETAL 3,129,846
IMPLEMENTS FOR SPREADING POWDERED OR GRANULAR MATERIALS
Filed July 26, 1960 3 Sheets-Sheet 1

INVENTOR.
Cornelis & Ary van der Lely
BY
Mason, Mason & Albright
Attorneys

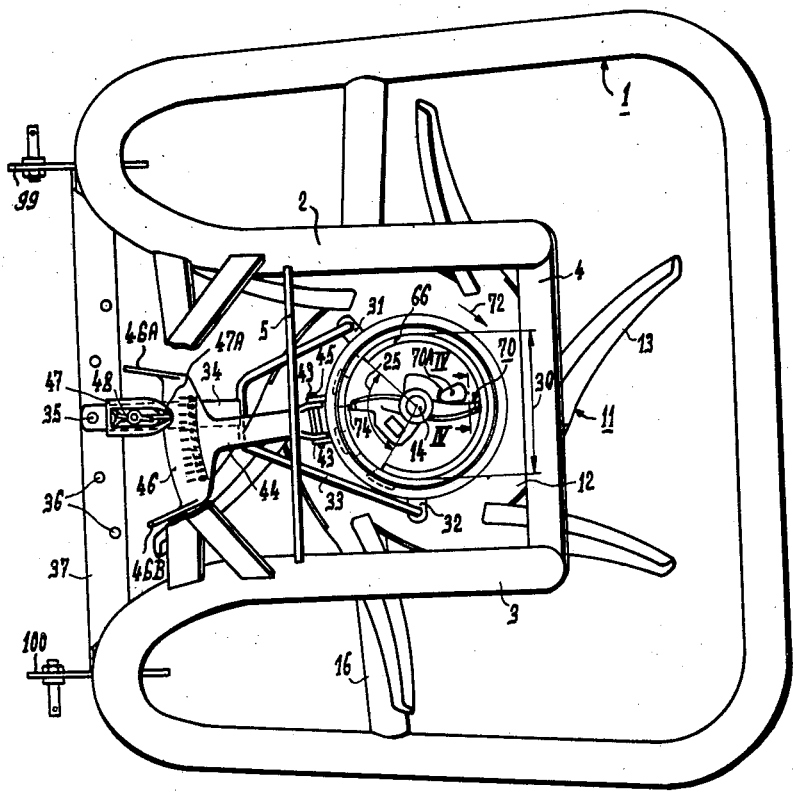
FIG. 3
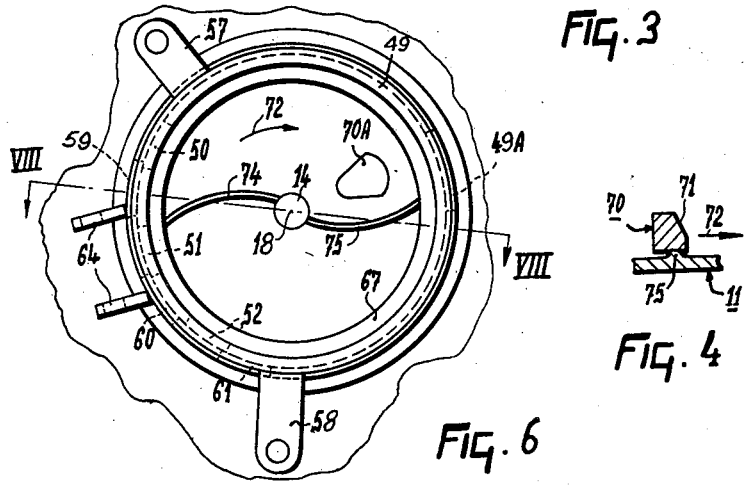
FIG. 6
FIG. 4
INVENTOR.
Cornelis & Ary van der Lely
BY
Mason, Mason & Albright
Attorneys

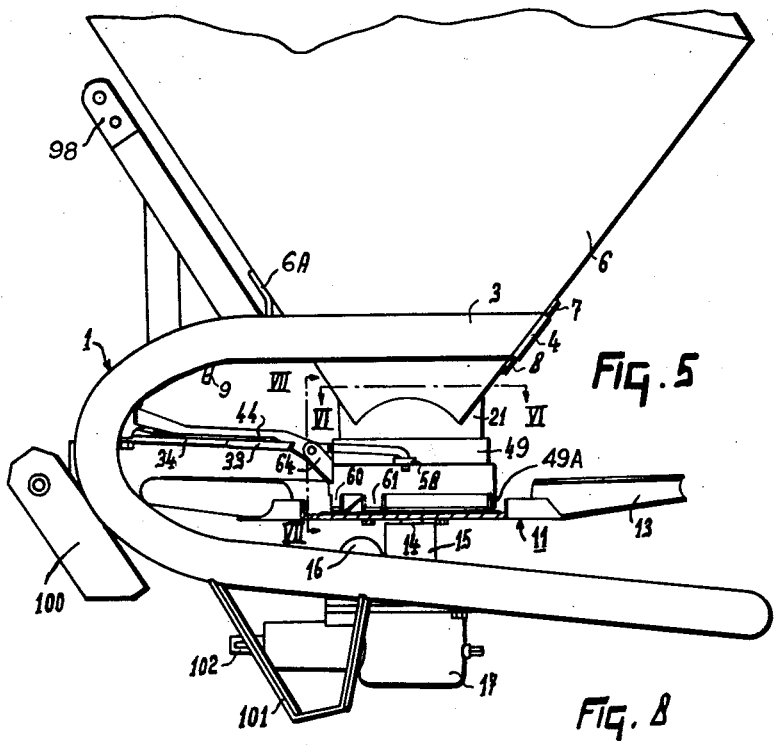
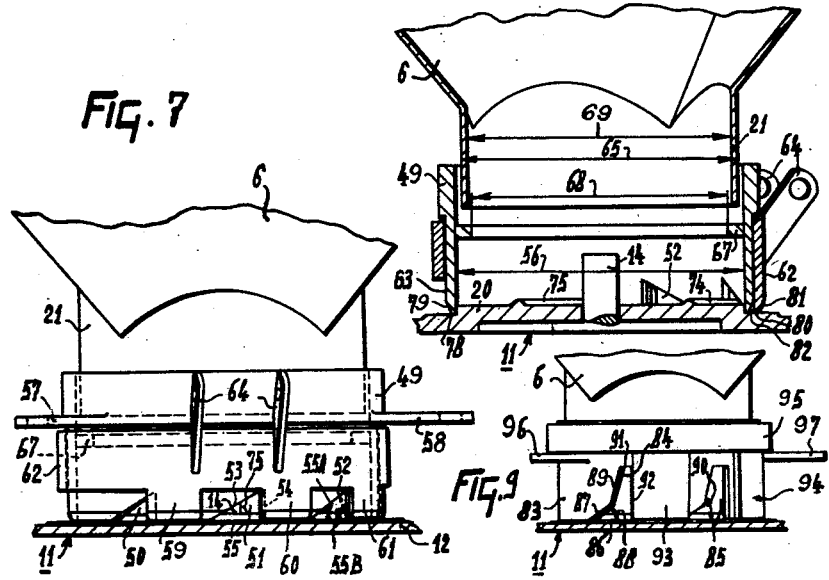

United States Patent Office 3,129,846
Patented Apr. 21, 1964

3,129,846
IMPLEMENTS FOR SPREADING POWDERED OR GRANULAR MATERIALS
Cornelis van der Lely, Zug, Switzerland, and Ary van der Lely, Maasland, Netherlands, assignors to C. van der Lely N.V., Maasland, Netherlands, a limited-liability company of the Netherlands
Filed July 26, 1960, Ser. No. 45,488
Claims priority, application Netherlands Oct. 26, 1959
2 Claims. (Cl. 222—48)

This invention relates to implements for spreading powdered or granular materials such as artificial fertilizers or seeds, of the kind which comprise a container for the material and at least one outlet port formed in a wall member through which material from the container must pass to reach an ejector, the ejector being adapted to be rotated to spread the material by means of the centrifugal force imparted to it as a result of the said rotation.

An object of the invention is to provide a spreading implement in which the area of the outlet port or ports can be readily adjusted to suit materials such as artificial fertilizers which require a large outlet area so that they can be spread with a fast rate of flow, or to suit materials such as seeds which require a much smaller outlet area and for which it is desirable that the rate of flow should be capable of relatively fine adjustment.

In accordance with the invention, there is provided an implement of the kind set forth, wherein a space between the container and the ejector is enclosed by a wall member formed with an opening or openings which at least partly define an outlet port or ports of a first type, and wherein provision is made of a further wall member formed with an opening or openings which at least partly define an outlet port or ports of a second type, the arrangement being such that the first mentioned wall member can be removed from its operative position and the said further wall member substituted therefor.

Figure 1:
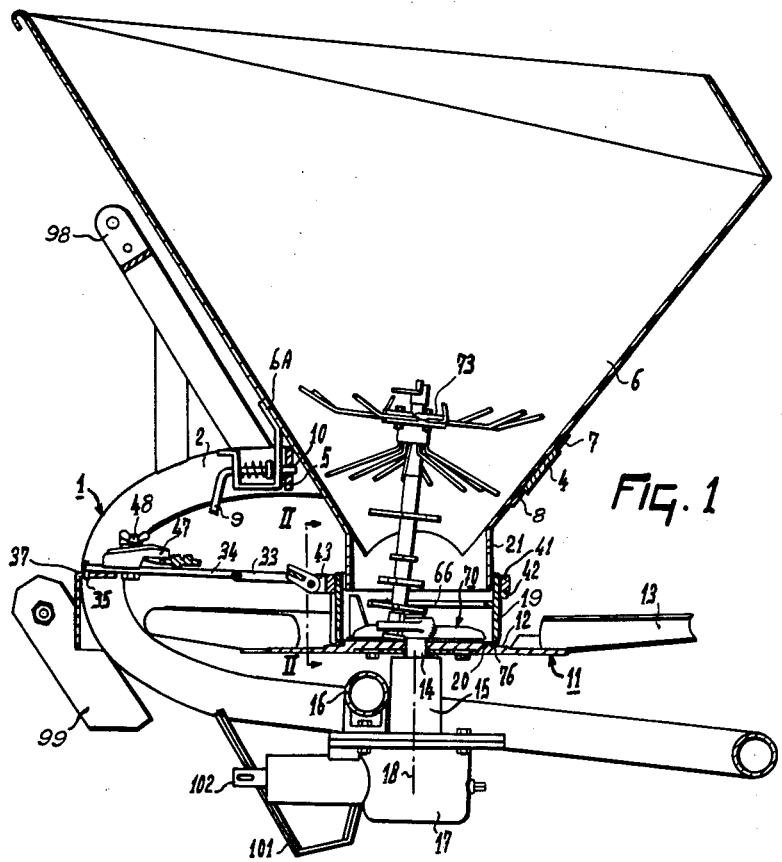
Figure 2:
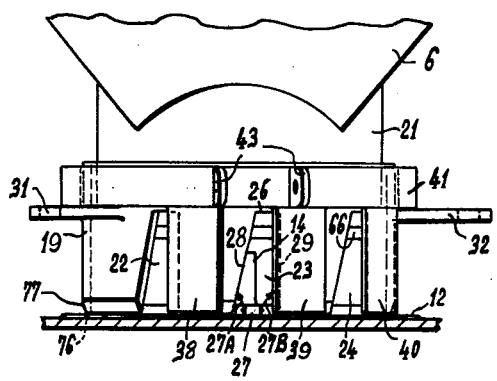

For a better understanding of the invention, and to show how the same may be carried into effect, reference will now be made, by way of example, to the accompanying drawings, in which:

FIGURE 1 is a side elevation, partly in section, of part of an implement in accordance with the invention, FIGURE 2 is a front elevation, to an enlarged scale and partly in section, taken on the line II—II of FIGURE 1, FIGURE 3 is a plan view corresponding to FIGURE 1 but with certain parts removed for the sake of clarity, FIGURE 4 is a section, to an enlarged scale, taken on the line IV—IV of FIGURE 2, FIGURE 5 is a similar view to FIGURE 1 but showing modifications of parts of the implement, FIGURE 6 is a view, to an enlarged scale, taken on the line VI—VI of FIGURE 5, FIGURE 7 is a front elevation, to an enlarged scale, and partly in section, taken on the line VII—VII of FIGURE 5, FIGURE 8 is a section taken on the line VIII—VIII of FIGURE 6, and FIGURE 9 is a front elevation, similar to FIGURES 2 and 7 but to a smaller scale, showing a further alternative embodiment of parts of the implement.

Referring to the drawings, the implement shown in FIGURES 1 to 4 comprises a curved main frame beam 1 (part of which is omitted in FIGURE 1) to which is secured an inclined arm 98 and two connecting strips 99 and 100, by means of which the implement can be coupled to lifting links carried by a tractor or other draft means. Feet 101 are attached to the underside of the frame beam 1 to support the implement on the ground when the lifting links just mentioned are lowered. The frame beam 1 supports a transverse frame beam 16 upon which a bearing 15 is mounted, in which latter a shaft 14 is journalled so as to be rotatable about a substantially vertical axis 18.

An ejector, indicated generally by the reference numeral 11, is secured to the upper end of the shaft 14 and comprises a disc 12 to which six curved distributing arms 13 are attached at regularly spaced intervals around its periphery. The shaft 14 derives its rotation from a substantially horizontal shaft 102 adapted to be connected to the power take-off of a tractor or the like through the intermediary of a transmission 17 secured to the transverse frame beam 16 below the bearing 15.

A generally conical shaped hopper or container 6 is releasably mounted above the ejector 11 on a supporting structure formed by the straight parallel ends 2 and 3 of the frame beam 1 and two transverse supporting strips 4 and 5. The container 6 has two locating strips 7 and 8 attached to it, these strips being adapted to lie respectively above and below the transverse supporting strip 4 and restrict movement of the container 6 in vertical directions. The container 6 also has a bracket 6A attached to it, the bracket 6A supporting a spring-loaded locking pin 9 which, when the container 6 is in position on the implement frame, engages in a hole 10 formed in the supporting strip 5. An agitator 73 is mounted so as to be rotatable with the ejector 11 about the axis 18, the agitator 73 extending into the lower end of the container 6 and being designed to prevent bridging or other blockage of the powdered or granular material contained therein.

The lower end of the container 6 is provided with a circular cylindrical portion 21 which fits into the upper end of a cylindrical annulus 19. The annulus 19 bears upon the upper surface of the disc 12, a raised circular portion 20 being formed in the center of the disc 12 whose margin abuts against the lowermost edge of the inner face of the annulus 19 and retains the latter in its appointed position with respect to the axis 18.

The annulus 19 is formed with three outlet ports 22, 23 and 24 through which material from the container 6 may pass to the curved arms 13 for ejection onto the ground. The outlet ports 22, 23 and 24 are identical in form and, together, subtend an angle of about 90° at the vertical axis 18. The outlet ports are all trapezium-shaped and will be further described with reference to the outlet port 23. This port has a base edge 27 formed by the upper surface of the ejector disc 12, an upper edge 26 extending parallel to the base 27, a vertical edge 29 and an inclined edge 28. The angle 27a between the base edge 27 and the inclined edge 28 is about 70° whereas the angle 27B between the base edge 27 and the edge 29 is, of course, 90°. In this particular embodiment, the length of the base 27 is about 30 mm., the length of the edge 26 is about 15 mm., and the length of the edge 29 is about 60 mm., the latter length being the vertical height of each outlet port. The inner diameter 30 (see FIGURE 3) of the annulus 19 is about 200 mm., so that the length of the base of the outlet port 23 is approximately one seventh of the inner diameter of the annulus 19, the height of the outlet port being approximately twice the length of its base.

The annulus 19 can be angularly adjusted about the axis 18 by means of an arm 34 which, through the intermediary of a bent rod 33, is connected to the annulus by two projecting lugs 31 and 32, the opposite ends of the rod 33 being received within a hole in each of the respective lugs. The arm 34 is provided at the end remote from the annulus with releasably securing means in the form of a downwardly projecting pin 35 which can lodge in any one of a row of five holes 36 provided in a transverse frame beam 37. The connection between the bent rod 33 and the lugs 31 and 32 is such that the pin 35 can readily be raised through a sufficient distance to bring it clear of any hole in the beam 37, thus allowing the arm 33 to be turned to effect angular adjustment of the annulus 19 about the axis 18.

Means is provided to control the quantity of material which can pass through the ports 22, 23 and 24 in a given time. This control means includes a shutter member in the form of a ring 41 which is arranged concentrically around the upper end of the annulus 19. The ring 41 is rotatable about the axis 18 but is prevented from sliding under gravity to the lower end of the annulus 19 by means of the two lugs 31 and 32 (FIGURES 2 and 3) and a stud 42 (FIGURE 1) which all project outwardly at different locations around the wall of the annulus 19. Three shutter plates 38, 39 and 40 extend downwardly from the ring 41 in such positions that they close the ports 22, 23 and 24 to a greater or lesser extent depending upon the angular relationship of the ring 41 to that of the annulus 19. The plates 38, 39 and 40 can be secured in any desired position of adjustment by means of an arm 44 which is connected to the ring 41 in such a way that it is immovable in horizontal directions relative thereto while being movable in vertical directions. The end of the arm 44 remote from the ring 41 carries a plate 46 on which a scale is marked, the ends of the plate 46 being formed as finger-pieces 46A. The plate 46 is movable relative to the arm 34 between two positions in which one or other of the finger-pieces 46A abuts against a clamp block 47, the block 47 carrying a pointer 47A which co-operates with the scale on plate 46. The block 47 lies partly above the plate 46 and is connected to the arm 34 by means of a bolt provided with a wing-nut 48. The arms 34 and 44 can thus be clamped relative to one another in any one of a number of different angular relationships by tightening the wing-nut 48 to lock the plate 46 between the arm 34 and the block 47. A desired relationship can be selected by an appropriate alignment of the pointer 47A and the scale just mentioned. This arrangement, of course, ensures that the ring 41 and the annulus 19 shall be disposed in a corresponding angular relationship and permits them to be turned together about the axis 18 without any alteration taking place in the amount by which the outlet ports 22, 23 and 24 are uncovered by the plates 38, 39 and 40. The arm 44 is forked at its inner end and is connected to two lugs 43 projecting from the wall of the ring 41 by means of a horizontal pivot pin 45, in order that the arm 44 and plate 46 can also be moved in a vertical direction at times when the pin 35 is lifted out of one of the holes 36 and shifted to another.

The annulus 19 may be replaced by an annulus 49 which is shown in the embodiment of the implement illustrated in FIGURES 5 to 8 of the drawings. In this case, the annulus 49 is provided with three outlet ports 50, 51 and 52 which each have the shape of a right-angled triangle and which together subtend an angle of about 90° at the axis 18. The outlet ports are all of the same shape and have a base edge 55, constituted by the upper surface of the disc 12, a vertical edge 54 and an inclined edge 53. The angle 55A between the inclined edge 53 and the base edge 55 is 35° whereas the angle 55B between the vertical edge 54 and the base edge 55 is, of course 90°. In this embodiment the length of the base 55 is again about 30 mm., but the length of the edge 54 which constitutes the height of each outlet port is only about 23 mm., so that the length of the base 55 is 1.4 times, that is to say nearly one and a half times, the height 54. The annulus 49 is angularly adjustable about the axis 18 in a similar manner to the annulus 19, and, for this purpose, is provided with projecting lugs 57 and 58. Since the remainder of the parts provided for effecting angular adjustment may be identical to those shown in connection with the annulus 19, they are not shown in detail in FIGURES 5 to 8.

The outlet ports 50, 51 and 52 can be closed to a greater or lesser extent by shutter plates 59, 60 and 61 which extend downwardly from, and constitute part of, a shutter member in the form of an annular ring 62. The ring 62 does not, as in the previous arrangement, bear upon the annulus 49 but surrounds the latter and bears independently upon the disc 12 of the ejector 11 by means of the lower edges of the shutter plates 59, 60 and 61 and a part 49A (FIGURES 5 to 8). The part 49A is approximately 180° removed around the axis 18 from the shutter plates 59 to 61 and prevents the ring 62 from sliding downwardly at an angle to the axis 18 and consequently becoming jammed against the annulus 49. The ring 62 surrounds the lower portion 63 of the annulus 49, the contacting surfaces of the ring 62 and the annulus 49 being accurately dimensioned so that a close fit is obtained. In order to be able to adjust the ring 62 angularly relative to the annulus 49 and thus control the rate of flow of the material through the outlet ports 50 to 52, lugs 64, similar to the lugs 43, are provided for the attachment of an arm 44 identical to that previously described. Since, as just stated, the arm 44 and its associated parts are identical to those previously described, these parts are not shown in detail in FIGURE 5 of the drawings.

In order to facilitate easy assembly of the implement and especially the mounting of the container 6 on its supporting structure, the outer diameter 65 (see FIGURE 8) of the cylindrical portion 21 at the lower end of the container 6 is substantially less than the inner diameter 30 of the annulus 19 or the inner diameter 56 of the annulus 49. Thus, it is not necessary that the longitudinal axis of the cylindrical portion 21 should coincide exactly with the axis 18 when the container 6 is mounted in its working position. When the inner diameter 30 is about 200 mm., as in the example described with reference to FIGURES 1 to 4, the outer diameter 65 of the cylindrical portion 21 may amount to about 195 mm. In order to ensure that no substantial quantity of material passes through the gap between the annulus 19 and the portion 21, the annulus 19 is provided with an inner sealing ridge 66. This ridge 66 lies just below the lowermost extremity of the cylindrical portion 21 and has an inner diameter which is less than that of the cylindrical portion 21 although, in practice, it is only necessary that it should not be greater than the outer diameter of the portion 21. The ridge 66 lies in a plane substantially perpendicular to the axis 18 and subtends an angle of about 270° at that axis since it is not provided over an approximately 90° arc of the annulus 19 in which are situated the outlet ports 22, 23 and 24. It has been found that very little material tends to pass upwardly between the annulus 19 and the cylindrical portion 21 in the immediate vicinity of the outlet ports. In the case of the annulus 49, on the other hand, a sealing ridge 67 (FIGURES 7 and 8) similar to the ridge 66 extends right around the whole of the inner surface of the annulus, since, in this case, the outlet ports 50, 51 and 52 have their upper extremities situated at a much lower level than in the case of the outlet ports in the annulus 19. The inner diameter 68 (FIGURE 8) of the sealing ridge 67 is, once again, smaller than the inner diameter 69 of the cylindrical portion 21.

It is particularly important that the ridge 66 or ridge 67 should be provided in cases in which an agitating blade 70 (FIGURES 3 and 4) is used. This blade 70 has an inclined surface 71 which extends upwardly and rearwardly with respect to the direction of rotation 72 of the ejector 11 and which, therefore, pushes the material upwardly towards the lower end of the cylindrical portion 21. This may tend to cause material to pass between the cylindrical portion 21 and the annulus 19 or annulus 49, but this tendency is sufficiently counteracted by the sealing ridge 66 or 67. The agitator blade 70 is provided with a slot in which the lower end of the agitator 73 previously referred to is received. The upper surface of the raised portion 20 of the ejector 11 is provided with two agitating ridges 74 and 75 which extend towards the periphery of the ejector from the axis 18. The ridges 74 and 75 do, in fact, curve rearwardly with respect to the direction of rotation 72 of the ejector 11, the curvature becoming more pronounced towards the outer ends of the ridges, which ends terminate at the periphery of the raised portion 20. The ridges 74 and 75 are of small height but are sufficient to ensure that, when the agitating blade 70 is not in use, the material is agitated and urged outwardly with respect to the axis 18 so that it passes readily through the outlet ports. A boss 70A is formed on the surface of the raised portion 20 in such a position that, when the agitator blade 70 is in use, the blade rests upon the ridges 74 and 75 (see FIGURES 3 and 4), the boss 70A abutting against the blade 70 and serving to rotate it with the ejector 11.

The lower edge 76 of the annulus 19 bears upon the ejector disc 12 and is reduced in thickness relative to the rest of the annulus due to the formation of a bevel 77 (FIGURE 2). The lower edge 78 of the annulus 49 is similarly provided with a bevel 79 so that its thickness also is reduced relative to that of the remainder of the annulus. The shutter plates 38, 39 and 40 which cooperate with the outlet ports in the annulus 19 do not themselves bear against the ejector disc 12 and therefore no modification is made to their lowermost edges. However, in the case of the shutter plates 59, 60 and 61 and the part 49A whose lower edges bear against the ejector disc 12, bevels 81 are provided so that the lower edges 80 of the plates and the said part 49A are of substantially reduced thickness with respect to the remainders thereof. It will be understood that the pressure per unit area of contact between the ejector disc 12 and the parts bearing thereon is increased by the provision of the lower edges of reduced thickness as just described. This decreases the likelihood of material finding its way out of the interior of the annulus 19 or 49 other than through the outlet ports provided for that purpose.

FIGURE 9 shows an embodiment of the implement in which an annulus 83 is provided with two outlet ports 84 and 85 which can be closed to a greater or lesser extent by means of shutter plates 93 and 94 attached to an annular ring 95 which is angularly adjustable relative to the annulus 83. The outlet ports 84 and 85 are identical to one another and, together, subtend an angle of about 90° at the axis 18. Each outlet port has a base edge 86 formed by the upper surface of the ejector disc 12, a vertical edge 92, an upper edge 91 parallel to the base edge 86, and two differently inclined edge portions 87 and 98 which intersect one another. The edge portion 87 is inclined to the base at an angle 88 of about 35° whereas the edge portion 89 is inclined to the base at an angle 90 of about 70°. The annulus 83 is provided with two lugs 96 and 97 by means of which it can be connected to an arm 34 in a manner identical to that previously described. The ring 95 bears against the upper faces of the lugs 96 and 97 and against a stud (not visible in FIGURE 9) and can be fixed in any desired angular relationship to the annulus 93 by means similar to those previously described.

The annulus 19 having the outlet ports 50 to 52 of a first type and the annulus 49 having the outlet ports 59 to 61 of a second type may be alternatively used at will in accordance with the type of material to be distributed. The outlet ports of the type provided in the annulus 19 are designed for use with material which has to be spread in fairly large quantities per unit area such, for example, as artificial fertilizer. The outlet ports provided in the annulus 49, on the other hand, are more suitable for use with material which has to be spread in much smaller quantities per unit area such, for example, as grass seed or lucerne seed. The surface area of each outlet port of the first type is approximately four times that of each outlet port of the second type so that, when using the annulus 19, about four times the maximum quantity of material per unit area can be spread as compared with the annulus 49. When the implement is spreading material at its maximum rate of flow, each outlet port is fully uncovered and its vertical edge is in alignment with an edge of the corresponding shutter plate but, when the rate of flow is reduced, the vertical edge of each outlet port such as 29 or 54 is, in effect, replaced by the said edge of the corresponding shutter plate. The rate of flow through outlet ports of the second type 50 to 52 can be more finely adjusted than can that through those of the first type 22 to 24. This will be readily apparent when it is realized that, due to the lengths of the bases of each type of outlet port being equal, the same amount of angular adjustment of the arm 44 changes the outlet ports in each case from "fully open" to "fully closed." However, since the area of each outlet port of the first type is approximately four times that of each outlet port of the second type, it will be seen that a given amount of angular adjustment of the ring 41 will cause a considerably greater alteration in the area of the outlet ports 22 to 24 than will the same amount of adjustment of the ring 62 in the case of the outlet ports 50 to 52.

The replacement of the annulus 19 by the annulus 49 or vice versa may be carried out in a simple manner merely by first removing the container 6 from its supporting structure, which only requires the locking pin 9 to be withdrawn from the hole 10 and a small tilting movement to be performed about the supporting strip 4. Subsequently the annulus 19 or 49 together with the ring 41 or 62 and the arms 34 and 44 can be lifted off the implement frame as a unit since each annulus is freely movable in vertical directions and only bears by its own weight on the ejector disc 12, the pin 35 being freely movable in each of the holes 36. The discarded unit can then be replaced by a similar unit incorporating an annulus having outlet ports of the desired type. Since no fastening members whatsoever are used other than the locking pin 9, the substitution just described can be effected in a very rapid and trouble free manner. It will be realized that it is not essential that the arms 34 and 44 should also be exchanged at times when the substitution of one annulus for another is made. If desired, a single pair of arms 34 and 44 may be used in conjunction with either annulus, the connections between the respective arms and the annulus and the ring being such that the parts can be quickly and easily assembled or disassembled.

As an alternative to the substitution of one annulus for another as just described, a single annulus such as 19 may be provided with two sets of outlet ports 22 to 24 and 50 to 52 which are removed from one another around the axis 18 by about 180°. For example, an annulus such as 19 may be provided with two sets of outlet ports such as 22 to 24 and 50 to 52, the two sets being approximately 180° removed from one another around the axis 18. The ring 41 is then provided with one large shutter plate lying opposite to the shutter plates 38, 39 and 40 and being adapted to completely close the set of outlet ports not in use. In order to substitute one set of outlet ports for the other all that is necessary is to turn the annulus through about 180° around the axis 18, means being provided to connect the bent rod 33 carrying the arm 34 to the annulus in two diametrically opposite positions.

In cases in which the parts which contact the upper surface of the ejector disc 12 are of reduced thickness as has previously been described, small openings may still be left even when the shutter plates are in the "fully closed" position and a small quantity of material may be lost through these. Such an opening is shown at 82 in FIGURE 8 and is formed between the bevel 79 and the inner face of the ring 62. In order to avoid these openings, the lower edge 76 of the annulus 19 or the lower edge 78 of the annulus 49 may have the bevel 77 or 79 withheld over a very short distance on either side of each outlet port. In order to prevent leakage of the material it is also important that a close and accurate fit should be secured between the annulus 19 and the ring 41 and between the annulus 49 and the ring 62. A similar close fit should also obtain between the inner surface of the annulus 19 or 49 and the outer edge of the raised portion 20 of the ejector disc 12.

In operation, an annulus having outlet ports of a shape appropriate to the material to be spread is mounted on the ejector disc 12 in the manner previously described in such a position that the outlet port or ports is or are arranged towards the front of the implement, that is to say towards that side of the implement upon which the means for connection to a tractor or the like are provided. The arm 33 is then adjusted in accordance with the desired area of distribution of the material relative to the implement and the arm 44 is similarly adjusted to give a desired rate of flow of the material. Upon rotation of the shaft 102 by means of the power take-off of the tractor or the like, the ejector will be rotated about the vertical axis 18 and the material will be distributed in substantially horizontal directions from the arms 13 of the ejector due to the centrifugal force imparted to it by the said rotation. As has been previously stated, an annulus having outlet ports of the first type will be used if the material is to be spread with a fast rate of flow whereas an annulus having outlet ports of the second type will be used in cases in which a much slower rate of flow of material with a consequent increase in the fineness of adjustment is necessary. However, in some cases an annulus such as 83 (FIGURE 9) may be used. The outlet ports 84 and 85 in this annulus constitute a combination of the first and second types previously mentioned. When fully open or substantially fully open, the outlet ports allow a fast rate of flow of material therethrough whereas, when the shutter plates 93 and 94 are moved to the left (in FIGURE 9) to an extent that the edge of the shutter plate 93 is coincident with the intersection point between the inclined edges 87 and 89, a greatly reduced rate of flow is allowed through the remaining part of each outlet port, these remaining parts being similar in shape to the ports 50 to 52 shown in FIGURE 7.

As an alternative to the constructions described, the outlet port or ports may be provided in an outer annulus which replaces the rings 41, 62 or 95 and within which is provided an inner annulus having a rectangular hole or holes which, by relative angular adjustment of the inner annulus and outer annulus, can be brought into register with the outlet port or ports to a greater or lesser extent.

What is claimed is:

1. An implement for spreading powdered or granular materials comprising a supporting frame including coupling means for connection to a tractor, a container carried by said frame, a lower cylindrical portion on said container, a horizontally disposed rotatable materials ejector disc rotatably carried by said frame under said container, a circular raised portion on the central upper surface of said disc, a plurality of radially extending distributing arms attached around said disc's periphery, a vertical shaft centrally connected to the underside of said disc, a cylindrical annulus around said lower portion of said container and bearing on said disc around said circular raised portion, outlet ports in said annulus, sealing ridge means incorporated on the inside of said annulus, power means comprising means to connect to the power take-off of a tractor interconnected to said shaft rotating said disc, ring means snugly embracing said annulus and including shutter plates bearing on said disc and selectively covering portions of said outlet ports, the lower edges of said annulus and said shutter plates being beveled, outlet control means for rotating said ring and said annulus relative to each other including rod means to rotate said annulus, arm means to rotate said ring, a scale associated with said arm means, clamp means selectively clamping said rod means and said arm means together at a position registered on said scale, releasable securing means securing said rod means and said arm means to said frame, whereby the dimensions of said outlet openings and their position relative to said frame is controllable, and agitation means extending upwardly from said disc.

2. In an implement for spreading powdered or granular materials, a container having a lower cylindrical portion, a rotatable ejector disc disposed relative to said container, a cylindrical annulus removably receiving said lower portion of said container and bearing on said disc, said annulus including a port having a first configuration, power means interconnected with said disc to rotate same, removable ring means embracing said annulus, said ring means including a shutter plate selectively covering a portion of said port, outlet control means for rotating said ring and said annulus relative to each other, the various elements being so constructed and arranged whereby said annulus may be interchanged with a further annulus which includes a port having a second configuration by lifting said container and said ring from engagement with said annulus and replacing it with said further annulus, wherein the port in said first annulus is substantially four times as large in area as the port in said second annulus, wherein the outlet port in said first and second annulus have said disc's surface as operative edges thereof, said edges being substantially the same length, wherein the outlet port in said first annulus is in the shape of a triangle, one edge of said triangle being inclined to said disc at an angle of approximately 35°, the outlet port in said second annulus being trapezoidal with one edge vertical and one edge inclined at approximately 70° relative to said disc.

References Cited in the file of this patent

UNITED STATES PATENTS

| | | |
|---|---|---|
| 641,429 | Baskin | Jan. 16, 1900 |
| 911,816 | Gielow | Feb. 9, 1909 |
| 1,301,868 | Nowack | Apr. 29, 1919 |
| 1,679,398 | Bonnot | Aug. 7, 1928 |
| 2,203,771 | Bennett | June 11, 1940 |
| 2,544,960 | Hoffman | Mar. 13, 1951 |
| 2,612,298 | Wearne | Sept. 30, 1952 |
| 2,619,260 | Giles et al. | Nov. 25, 1952 |
| 2,644,618 | Oehler | July 7, 1953 |
| 2,690,860 | Kriegbaum et al. | Oct. 5, 1954 |

FOREIGN PATENTS

| | | |
|---|---|---|
| 496,565 | Great Britain | Nov. 30, 1938 |